United States Patent [19]

Hensiek

[11] Patent Number: 4,660,882
[45] Date of Patent: Apr. 28, 1987

[54] ROOF BOW

[75] Inventor: Benjamin E. Hensiek, Warrenton, Mo.

[73] Assignee: The Binkley Company, Warrenton, Mo.

[21] Appl. No.: 810,236

[22] Filed: Dec. 18, 1985

[51] Int. Cl.$^4$ .......................... B62D 25/06; E04C 3/07
[52] U.S. Cl. .................................... 296/104; 296/118; 52/731
[58] Field of Search ...................... 296/104, 118, 214; 52/731, 738, 531

[56] References Cited

U.S. PATENT DOCUMENTS

| 851,932 | 4/1907 | Grossman | 52/738 |
| 1,672,181 | 6/1928 | Stokes | 296/118 |
| 2,169,254 | 8/1939 | Kotrbaty | 52/731 |
| 2,194,901 | 3/1940 | Heuer | 296/118 |
| 2,577,671 | 12/1951 | Barrett | 296/118 |
| 3,700,277 | 10/1972 | Montean, Jr. | 296/104 |

FOREIGN PATENT DOCUMENTS 821311 10/1959 United Kingdom ................ 296/118

Primary Examiner—Robert B. Reeves
Assistant Examiner—Dennis H. Pedder
Attorney, Agent, or Firm—Senniger, Powers, Leavitt and Roedel

[57] ABSTRACT

A roof bow comprising an elongate member formed of sheet metal having an elongate intermediate reach and integral end reaches. The elongate member is formed to have in transverse cross-section a central web, side flanges integral with the web and lips integral with the side flanges at free edges of the side flanges. The flanges, in the intermediate reach of the elongate member, extend upwardly from the web, and the lips, in the intermediate reach, extend inwardly toward one another from the flanges and are generally coplanar. The portions of the flanges in each end reach of the roof bow are deformed with respect to the portions thereof in the intermediate reach to have a gradual transition from their upwardly extending disposition with respect to the web to a laterally outwardly extending position generally coplanar with the web. Portions of the lips along the end reaches lie generally flat against respective outer surfaces of the flanges. The elongate member is bent downwardly adjacent the end reach to have a generally flat end portion for attachment to a side member of a vehicle.

4 Claims, 7 Drawing Figures

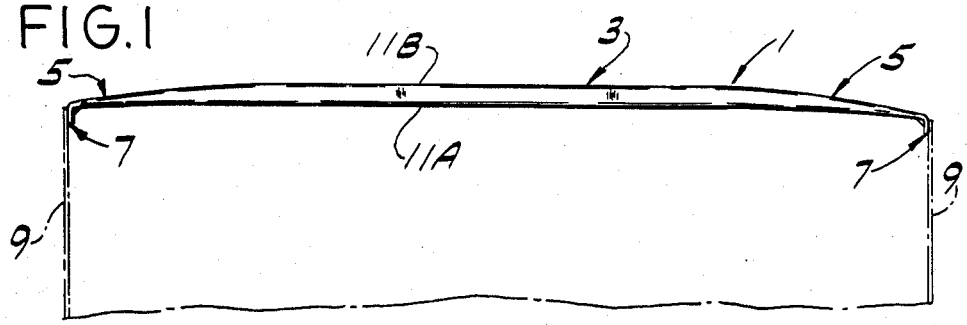
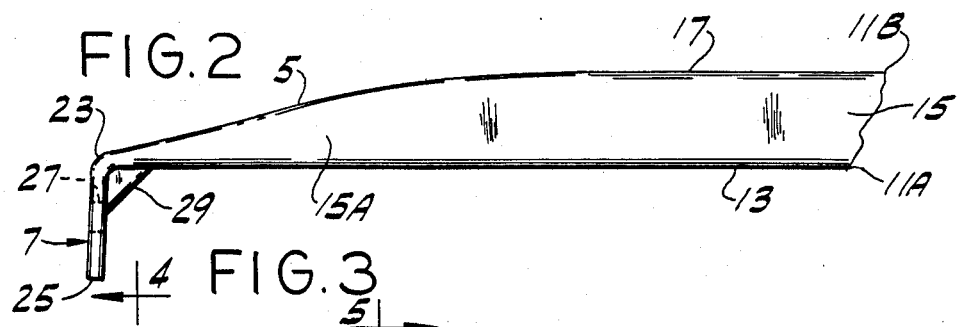
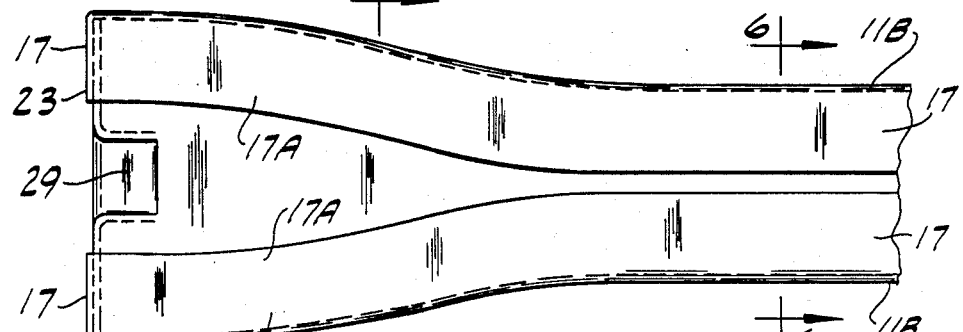
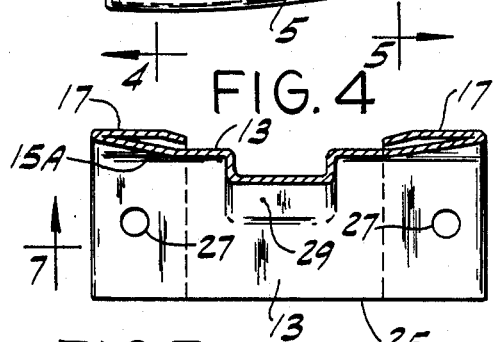
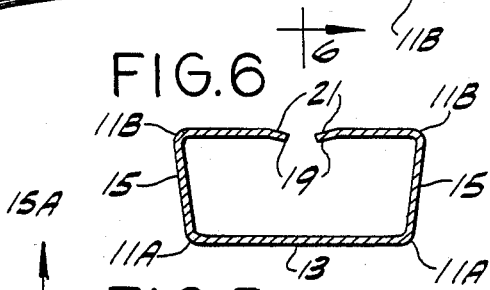
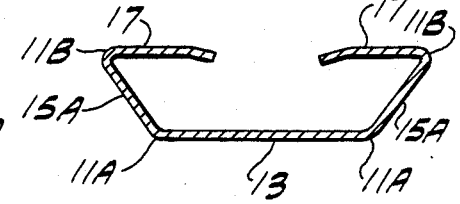
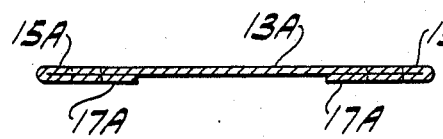

ROOF BOW

BACKGROUND OF THE INVENTION

This invention relates to roof bows and more particularly to a roof bow such as is used to support roof covering of a truck, van or trailer.

The invention is in the same general field as the Roof Bow Device shown in U.S. Pat. No. 3,700,277 issued Oct. 24, 1972, and involves an improvement thereover.

SUMMARY OF THE INVENTION

Among the several objects of the invention may be noted the provision of an improved roof bow of the class described formed of sheet metal and having relatively high bending strength for the amount of sheet metal therein; and the provision of such a bow of good appearance and convenience in manufacture.

In general, a roof bow of this invention comprises an elongate member formed of sheet metal having an elongate intermediate reach and integral end reaches, said member being formed to have in transverse cross-section a central web, side flanges integral with the web and lips integral with the side flanges at the edges of the side flanges opposite to the central web. In the intermediate reach of said member, the flanges extend upwardly from the web and the lips extend inwardly toward one another from the flanges and are generally coplanar so that the intermediate reach of the member is generally box-like in transverse cross-section. The portions of the flanges in each said end reach of the roof bow are deformed with respect to the portions thereof in the intermediate reach to have a gradual transition from their upwardly extending disposition with respect to the web to a laterally outwardly extending position generally coplanar with the web and extending in said generally coplanar position generally from a line transverse to the roof bow spaced inwardly from the respective outer end of said member a short distance relative to the length of said transition. The portions of the lips in each said end reach of the roof bow retain their generally coplanar relationship out to the respective outer end of said member with the portions of said lips from said line to said outer end of said member lying generally flat against the portions of the flanges from said line to said outer end of said member, said member being bent downwardly adjacent said line to have a downwardly extending generally flat end portion for attachment to a side member of a vehicle.

Other objects and features will be in part apparent and in part pointed out hereinafter.

BRIEF DESCRIPTION OF THE DRAWINGS

FIG. 1 is a view in elevation of a roof bow of this invention attached to the sides of a vehicle, the sides being shown in phantom;

FIG. 2 is an enlarged fragment of FIG. 1 showing an end reach of the bow;

FIG. 3 is a plan of FIG. 2;

FIGS. 4–6 are vertical transverse sections on lines 4—4, 5—5 and 6—6, respectively, of FIG. 3; and FIG. 7 is a transverse section on line 7—7 of FIG. 4.

Corresponding reference characters indicate corresponding parts throughout the several views of the drawings.

DESCRIPTION OF THE PREFERRED EMBODIMENT

Referring to the drawings, a roof bow of this invention is shown as comprising an elongate member 1 formed of sheet metal and having an elongate intermediate reach 3 and integral end reaches 5, the latter having bent-down end portions 7 for attachment to the sides 9 of a vehicle (e.g. a truck, van or trailer). The elongate member 1 is formed from sheet metal strip stock, for example, strip stock of 0.058 inch thick 50,000 pound yield point steel about 5 inches wide. This is bent along lines 11A and 11B extending lengthwise thereof to have, in transverse section, a central web 13, side flanges 15 integral with the web, and lips 17 integral with the side flanges at the free edges of the side flanges. In member 1, as initially formed, and in the intermediate reach 3, as finally formed, the side flanges 15 extend upwardly from the web 13 and are slightly divergent away from one another in the direction outwardly (upwardly) from the web (see FIG. 6). The lips extend inwardly toward one another from the flanges, their width being such that their inner edges 19 are spaced apart (about 7/32 inch, for example). The lips are generally coplanar, except that their inner margins 21 are bent slightly toward the web 13.

As initially formed, the member 1 is of the box-like cross-section or lipped channel section which appears in FIG. 6 throughout the length of the member. In accordance with this invention, the member 1 is then subjected to further working to form the stated integral end reaches 5 with the bent-down end portions 7. As to each of the stated end reaches 5, the portions 15A of the flanges 15 therein are deformed with respect to the main portions thereof in the intermediate reach 3 to have a gradual transition from their upwardly extending disposition with respect to the web 13, which is their disposition as the roof bow is used on a vehicle (and their disposition as shown in FIG. 6 of the drawing) to a laterally outwardly extending position generally coplanar with the web 13 as shown in FIGS. 3, 4 and 7. The flanges, so deformed into said position generally coplanar with the web, extend in said position generally coplanar with the web generally from a line 23 transverse to the roof bow spaced inwardly from the respective outer end 25 of the member 1 a short distance relative to the length of said transition.

The portions 17A of the lips 17 in each said end reach 5 of the roof bow retain their generally coplanar relationship, without being twisted, out to the respective outer end 25 of the member 1 end with the portions of the lips from the line 23 to the end 25 lying generally flat against the portions 15A of the flanges from said line 23 to the end 25. The member 1 is bent downwardly as appears in FIGS. 1–4 adjacent said line 23 to have said downwardly extending end portion 7 for attachment to a side member 9 of a vehicle. Said downwardly extending flat end portion 7 includes a flat portion 13A of the web 13, portions 15A of the flanges 15 generally coplanar with portion 13A, and portions 17A of the lips 17 generally flat against the outside of the flange portions 15A. End portion 7 is provided with holes 27 through the lip portions 17A and flange portions 15A for receiving fasteners for purposes of said attachment. The web may be struck in between the lips at the bend on line 23 to provide a gusset 29 of triangular form for strengthening the roof bow at the bend. The roof bow may be slightly arched upwardly from one bend line 23 to the other, e.g. a bow which is about 8 feet long from one bend line 23 to the other may be arched up ½ inch at its center of length.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A roof bow comprising an elongate member formed of sheet metal having an elongate intermediate reach and integral end reaches, said member being formed to have in transverse cross-section a central web, side flanges integral with the web and lips integral with the side flanges at edges of the side flanges opposite to the central web, the flanges, in the intermediate reach of said member, extending upwardly from the web, and the lips, in the intermediate reach, extending inwardly toward one another from the flanges and being generally coplanar so that the intermediate reach of the member is generally box-like in transverse cross-section, portions of the flanges in eahc said end reach of the roof bow being deformed with respect to portions thereof in the intermediate reach to have a gradual transition from their upwardly extending disposition with respect to the web to a laterally outwardly extending position generally coplanar with the web and extending in said generally coplanar position from a point spaced inwardly from the respective outer end of said member, said lips, in each said end reach of the roof bow, retaining their generally coplanar relationship out to a respective outer end of said member with portions of said lips from said point to said outer end of said member lying generally flat against respective outer surfaces of the flanges, said member being bent downwardly adjacent said point to have a downwardly extending generally flat end portion for attachment to a side member of a vehicle.

2. A roof bow as set forth in claim 1 wherein the flanges throughout said intermediate reach of said elongate member are slightly divergent from one another upwardly from the web.

3. A roof bow as set forth in claim 1 wherein the lips throughout said intermediate reach of said member extend inwardly toward one another from the flanges in generally coplanar relation with their inner margins spaced apart and bent slightly toward the web.

4. A roof bow as set forth in claim 1 wherein the flanges throughout said intermediate reach of said elongate member are divergent from one another upwardly from the web and wherein the lips throughout said intermediate reach of said member extend inwardly toward one another from the flanges in generally coplanar relation with their inner margins spaced apart and bent slightly toward the web.

* * * * *